(12) United States Patent
Katoh et al.

(10) Patent No.: US 11,206,630 B2
(45) Date of Patent: Dec. 21, 2021

(54) INFORMATION PROCESSING SYSTEM

(71) Applicants: KYOTO UNIVERSITY, Kyoto (JP);
ALLIED TELESIS HOLDINGS K.K., Tokyo (JP)

(72) Inventors: Noriyasu Katoh, Tokyo (JP); Koji Yamamoto, Kyoto (JP); Shotaro Kamiya, Kyoto (JP)

(73) Assignees: KYOTO UNIVERSITY, Kyoto (JP);
ALLIED TELESIS HOLDINGS K.K., Tokyo (JP)

(*) Notice: Subject to any disclaimer, the term of this patent is extended or adjusted under 35 U.S.C. 154(b) by 0 days.

(21) Appl. No.: 16/599,949

(22) Filed: Oct. 11, 2019

(65) Prior Publication Data

US 2020/0314790 A1 Oct. 1, 2020

(30) Foreign Application Priority Data

Mar. 25, 2019 (JP) ................. JP2019-56672

(51) Int. Cl.
*H04W 64/00* (2009.01)
*H04B 17/318* (2015.01)

(52) U.S. Cl.
CPC .......... *H04W 64/00* (2013.01); *H04B 17/318* (2015.01)

(58) Field of Classification Search
CPC ...... H04B 17/27; H04B 17/318; H04W 64/00
See application file for complete search history.

(56) References Cited

U.S. PATENT DOCUMENTS

| 9,538,332 | B1* | 1/2017 | Mendelson | ......... H04W 40/244 |
| 10,368,217 | B2* | 7/2019 | åstrom et al. | ......... H04W 4/023 |
| 2009/0312037 | A1* | 12/2009 | Jo | ............... G01S 5/08 455/456.2 |
| 2014/0120955 | A1* | 5/2014 | Padden | ................ H04W 36/32 455/456.6 |
| 2014/0213176 | A1* | 7/2014 | Mendelson | ............... G01S 5/04 455/39 |

(Continued)

FOREIGN PATENT DOCUMENTS

| CN | 1988550 A | * | 6/2007 | |
| EP | 3093683 A1 | * | 11/2016 | ............ G06F 30/18 |

(Continued)

*Primary Examiner* — Matthew C Sams
(74) *Attorney, Agent, or Firm* — Concept IP LLP; Michael Zarrabian

(57) ABSTRACT

There is provided an information processing system including a relative-position estimation processing unit configured to estimate a relative position between an access point and a wireless client by using a cooperative position estimation method using distance information based on a signal strength between the access point and the wireless client; and an inside/outside determination processing unit configured to determine an inside/outside positional relationship between a polygonal target area formed by access points and the wireless client, in which the inside/outside determination processing unit determines whether the wireless client is present inside or outside the target area by determining a direction of vector product of the access points forming a side of the target area and a direction of vector product of the wireless client and the access point as a vertex of the polygonal area.

8 Claims, 12 Drawing Sheets

(56) References Cited

U.S. PATENT DOCUMENTS

2016/0334498 A1* 11/2016 Jamieson .................. G01S 5/04
2017/0079001 A1* 3/2017 Lewis ..................... H04W 4/02
2019/0205936 A1* 7/2019 Lal .......................... H04W 4/12

FOREIGN PATENT DOCUMENTS

GB           2460406 A  * 12/2009  ........... G01S 5/0289
JP        2012255673 A     12/2012
WO    WO-2015114313 A1 *  8/2015  ........... G01S 5/0221

* cited by examiner

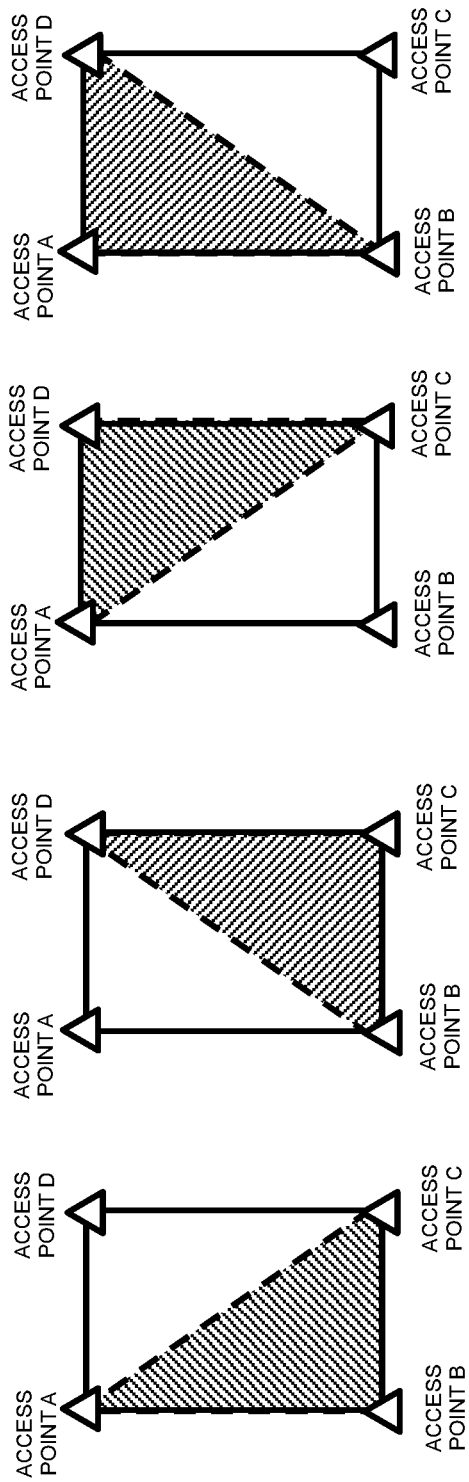

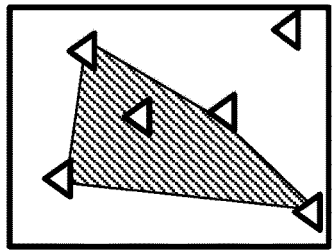
FIG. 7D
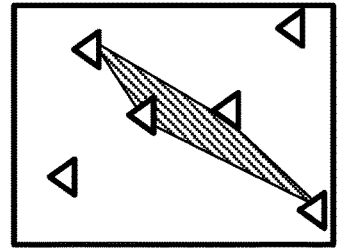
FIG. 7I
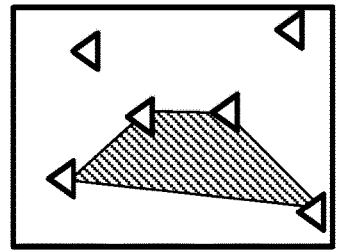
FIG. 7N
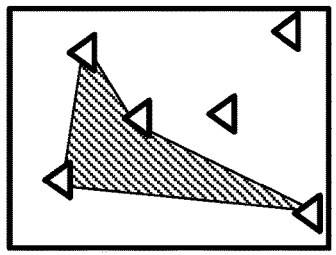
FIG. 7C
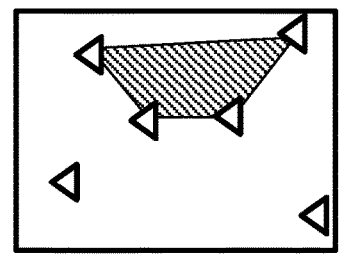
FIG. 7H
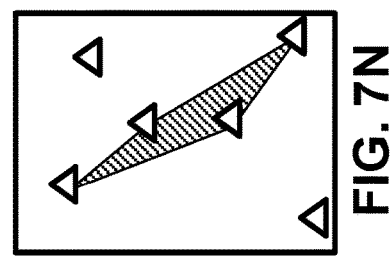
FIG. 7M
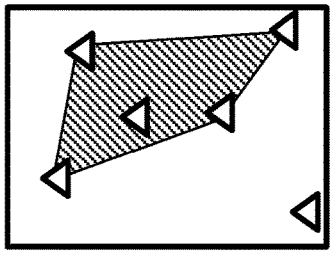
FIG. 7B
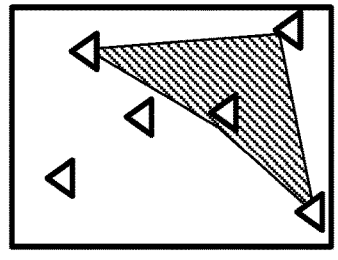
FIG. 7G
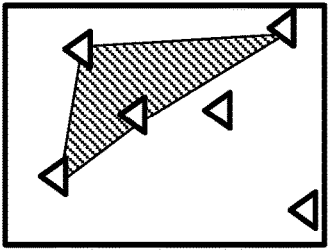
FIG. 7L
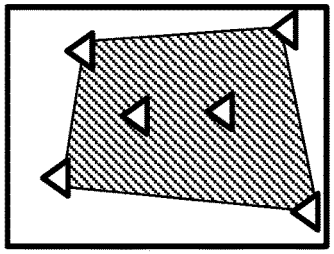
FIG. 7A
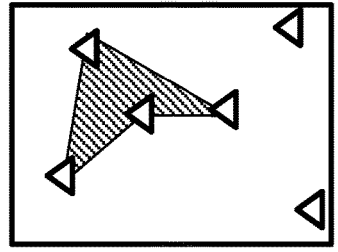
FIG. 7F
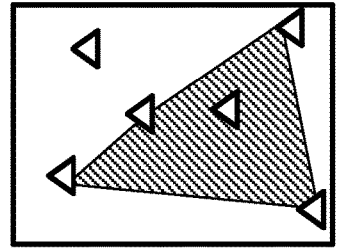
FIG. 7K
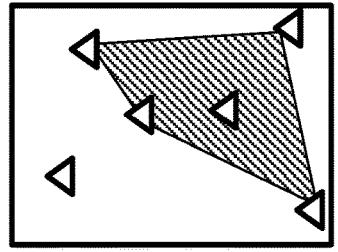
FIG. 7E
FIG. 7J
FIG. 7O

INFORMATION PROCESSING SYSTEM

CROSS-REFERENCE TO RELATED APPLICATIONS

This application claims priority under 35 U.S.C. § 119 to Japanese Application No. 2019-56672, filed Mar. 25, 2019, the contents of which are hereby incorporated by reference herein for all purposes.

TECHNICAL FIELD

The present invention relates to an information processing system which estimates a position of a wireless client used in wireless communication.

BACKGROUND

In the related art, a position of a wireless client used in wireless communication is estimated for specifying a traffic flow of people or a concentration condition of people in various spaces such as stores and event spaces. A typical example of the estimation method is a method using three-point positioning disclosed in JP 2012-255673 A.

SUMMARY

It is possible to estimate a position of a wireless client in a coordinate plane by using a method using three-point positioning as disclosed in JP 2012-255673 A. In the three-point positioning, first, the position coordinates of access points of the wireless communication in the coordinate plane are accurately set in advance. In the method, a straight line distance between the wireless client and each access point is calculated on the basis of the signal strength of radio waves in the wireless communication between each access point and the wireless client, and position coordinates of the wireless client in a plane space are calculated using the straight line distance. In this manner, it is possible to estimate the position of the wireless client on the coordinate plane.

In the method using three-point positioning, since the position coordinates of the wireless client are calculated, it is necessary to accurately set the position coordinates of the access points in advance, which causes a heavy burden on the installation work. In addition, since the position of the wireless client is specified as the position coordinates in the coordinate plane, the access point cannot be moved. Further, in a case where there is an obstacle on a straight line between the access point and the wireless client (shadowing), there may be an error in a straight line distance which is calculated using the signal strength due to the influence of the obstacle on the signal strength of the radio wave received by the wireless client, and since calculation is performed with the error being included, an error is likely to occur in the position coordinates of the wireless client.

In view of above circumstances, the inventors have invented an information processing system which estimates a position of a wireless client while reducing a burden on work of installing access points. In addition, the inventors have invented an information processing system which estimates a position of a wireless client while reducing the influence of shadowing.

A first aspect of the invention is an information processing system which includes a relative-position estimation processing unit configured to estimate a relative position between an access point and a wireless client by using a cooperative position estimation method using distance information based on a signal strength between the access point and the wireless client; and an inside/outside determination processing unit configured to determine an inside/outside positional relationship between a polygonal target area formed by access points and the wireless client, in which the inside/outside determination processing unit is configured to determine whether the wireless client is present inside or outside the target area by determining a direction of vector product which is calculated using a position vector from one access point to the wireless client and a position vector from another access point other than the one access point to the one access point, for each of the access points forming the target area.

In the invention, unlikely the three-point positioning in the related art, the position coordinates of the wireless client are not calculated, and thus it is not necessary to strictly set the position of the access point. Therefore, it is possible to reduce a burden on installation of access points. In addition, since an area of an access point where the wireless client is present is specified, it is possible to estimate the position of the wireless client while reducing the influence of shadowing.

In the above aspect, the inside/outside determination processing unit may be configured to divide the target area into a plurality of inside/outside determination areas, determine whether the wireless client is present inside or outside the inside/outside determination area by determining a direction of vector product which is calculated using a position vector from one access point to the wireless client and a position vector from another access point other than the one access point to the one access point, for each of the access points forming the divided inside/outside determination area, and in a case where determination is made that the wireless client is present inside the inside/outside determination area for at least one or more of the inside/outside determination areas, determine that the wireless client is present inside the target area.

The signal strength is not constant and is changed. In addition, in some cases, the signal strength may be affected by shadowing. Therefore, in a case where the target area is divided into areas and whether the wireless client is present inside any of the divided areas is determined, it is possible to improve the determination accuracy as compared with a case where whether the wireless client is present inside or outside the target area is determined in units of the target area.

In the above aspect, as the information processing system, the target area may be an area formed by increasing a distance between the access points or a distance between the access point and the wireless client by a predetermined ratio or a predetermined value.

In the above aspect, as the information processing system, the target area may be an area formed by enlarging an area of the target area by a predetermined ratio or a predetermined value while a similarity is maintained.

The target area may be formed not only by the access points themselves but also by an area enlarged from the access points. By doing this, it is possible to reduce the change of the signal strength or the influence of shadowing.

A fifth aspect of the invention is an information processing system which includes a relative-position estimation processing unit configured to estimate a relative position between an access point and a wireless client by using a cooperative position estimation method using distance information based on a signal strength between the access point and the wireless client; an inside/outside determination processing unit configured to determine an inside/outside positional relationship between a polygonal target area formed by access points and the wireless client; and a boundary determination processing unit configured to determine an inside/outside positional relationship between the wireless client and a boundary area which is an area near a boundary of the target area, in which the boundary determination processing unit is configured to determine whether the wireless client is present inside or outside the boundary area by using a distance between the wireless client and a straight line including a side, the distance being calculated on the basis of a magnitude of vector product calculated from a distance between the access points and the relative position between the access point and the wireless client for each of sides forming the target area, in a case where the wireless client is determined to be present inside the boundary area, determine that the wireless client is present inside the target area, and in a case where the wireless client is determined to be present outside the boundary area, execute the inside/outside determination processing.

With the configuration of the fifth aspect of the invention, it is possible to achieve technical effects similar to those of the first aspect of the invention. That is, it is possible to reduce a burden on installation of access points. In addition, it is possible to estimate the position of the wireless client while reducing the influence of shadowing or the like. That is, in a case where the wireless client is present in the vicinity of the side of the target area, an error is likely to occur in the determination on whether the wireless client is present inside or outside the target area due to the change of the signal strength or the influence of shadowing. As in the present invention, in a case where a boundary area is set and the wireless client is determined to be present inside the target area when the wireless client is present inside the boundary area, it is possible to reduce the influence of the shadowing.

In the above aspect, as the information processing system, the boundary determination processing unit may be configured to calculate, for each of sides forming the target area, a distance between a straight line including the side and the wireless client on the basis of a magnitude of vector product calculated from a distance between the access points and the relative position between the access point and the wireless client, in a case where among the distances, two distance are shorter than a predetermined reference distance or in a case where one distance is shorter than the reference distance and a longer one of the distances between the wireless client and the two access points forming the corresponding side is shorter than a length of the corresponding side, determine that the wireless client is present inside the boundary area, and in other cases, determine that the wireless client is present outside the boundary area.

The boundary determination processing may be executed by processing of the invention.

In the above aspect, as the information processing system, the information processing system may further include a location area determination processing unit configured to determine that the wireless client is present inside an area which is common in the target areas for which determination is made that the wireless client is present inside.

As in the above aspect, determining an area where the wireless client is present is performed by determining an area which is common in the target areas for which determination is made that the wireless client is present inside. Therefore, if the number of target areas is increased, it is possible to achieve technical effects of narrowing down and determining the area where the wireless client is present.

The information processing system of the first aspect can be realized by causing a computer to read and execute a program of the invention. That is, there is an information processing program causing a computer to function as a relative-position estimation processing unit configured to estimate a relative position between an access point and a wireless client by using a cooperative position estimation method using distance information based on a signal strength between the access point and the wireless client; and an inside/outside determination processing unit configured to determine an inside/outside positional relationship between a polygonal target area formed by access points and the wireless client, in which the inside/outside determination processing unit is configured to determine whether the wireless client is present inside or outside the target area by determining a direction of vector product which is calculated using a position vector from one access point to the wireless client and a position vector from another access point other than the one access point to the one access point, for each of the access points forming the target area.

The information processing system of the fifth aspect can be realized by causing a computer to read and execute a program of the invention. That is, there is an information processing program causing a computer to function as a relative-position estimation processing unit configured to estimate a relative position between an access point and a wireless client by using a cooperative position estimation method using distance information based on a signal strength between the access point and the wireless client; an inside/outside determination processing unit configured to determine an inside/outside positional relationship between a polygonal target area formed by access points and the wireless client; and a boundary determination processing unit configured to determine an inside/outside positional relationship between the wireless client and a boundary area which is an area near a boundary of the target area, in which the boundary determination processing unit is configured to determine whether the wireless client is present inside or outside the boundary area by using a distance between the wireless client and a straight line including a side, the distance being calculated on the basis of a magnitude of vector product calculated from a distance between the access points forming the side and the relative position between the access point and the wireless client for each of sides forming the target area, in a case where the wireless client is determined to be present inside the boundary area, determine that the wireless client is present inside the target area, and in a case where the wireless client is determined to be present outside the boundary area, execute the inside/outside determination processing.

By using the information processing system of the invention, it is possible to estimate the position of the wireless client while reducing a burden on work of installing the access point. In addition, it is possible to estimate the position of the wireless client while reducing the influence of shadowing.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which:

FIGS. 4A to 4D are diagrams schematically illustrating examples of inside/outside determination processing;

FIGS. 7A to 7O are diagrams schematically illustrating examples of a state in which a target area is set;

DETAILED DESCRIPTION

Figure 1:
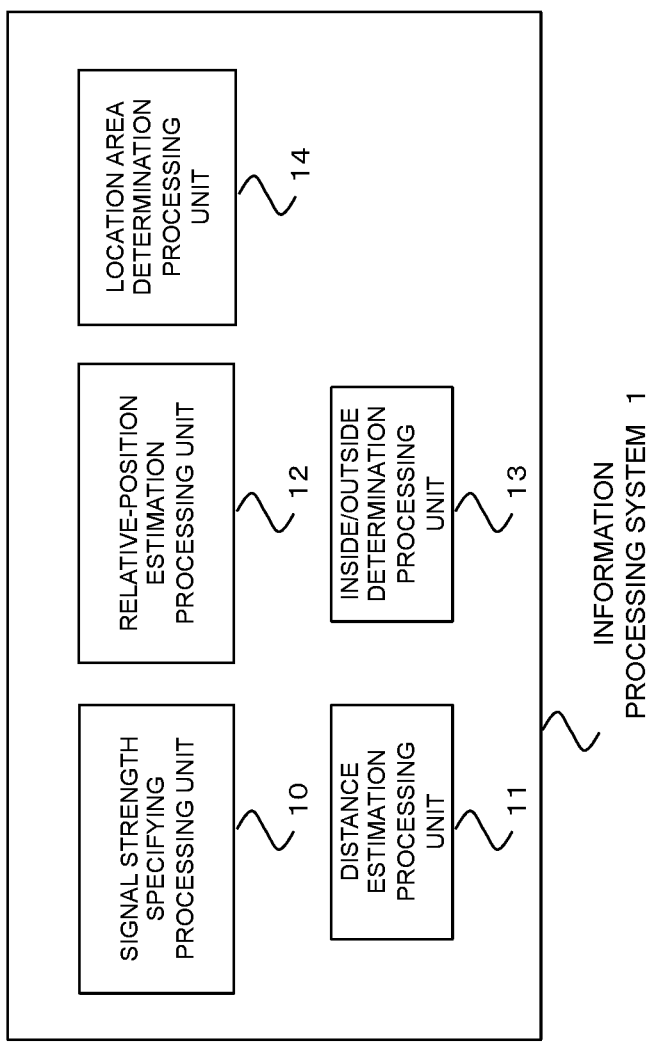
FIG. 1 is a block diagram schematically illustrating an example of processing functions of an information processing system of the invention.

An information processing system 1 of the invention estimates a position of a wireless client by estimating whether the wireless client is present inside or outside an area formed by a plurality of access points used in wireless communication. FIG. 1 schematically illustrates an example of processing functions of the information processing system 1 of the invention using a block diagram. In the specification, a wireless LAN is described as an example of the wireless communication, but the wireless communication can be realized similarly by wireless communication other than the wireless LAN, for example, various kinds of wireless communication such as Bluetooth (registered trademark) or beacon. The access point is communication equipment for connecting the wireless client to a network. In addition, the wireless client is a portable communication terminal used by a user or the like, and can be connected to a network such as the Internet via the access point.

Figure 2:
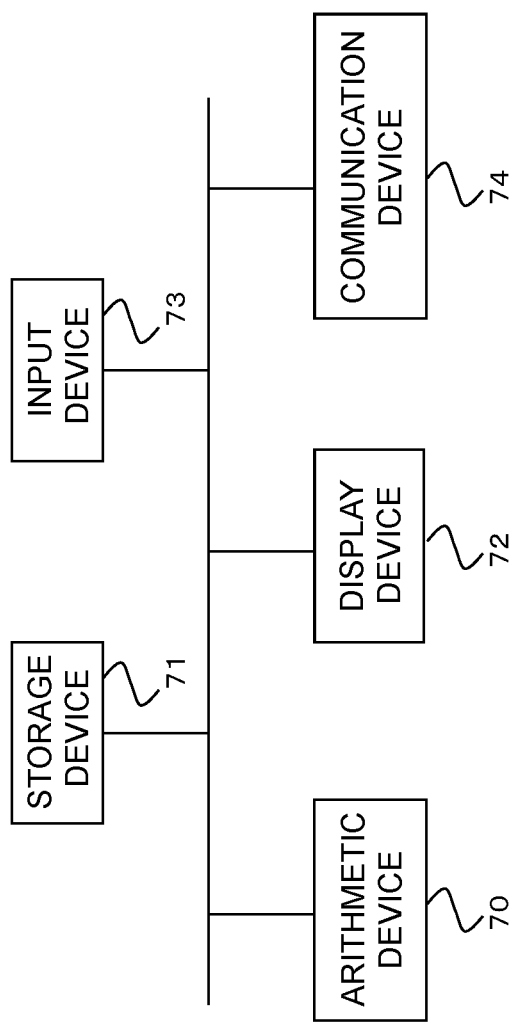
FIG. 2 is a diagram illustrating an example of a hardware configuration of a computer using the information processing system of the invention.

The information processing system 1 of the invention is realized by various computers such as a server or a personal computer. FIG. 2 illustrates an example of a hardware configuration of a computer. The computer includes an arithmetic device 70 such as a CPU which executes arithmetic processing of a program, a storage device 71 such as RAM or a hard disk which stores information, a display device 72 such as a display, an input device 73 such as a keyboard or a pointing device (mouse or ten key), and a communication device 74 which transmits or receives processing results of the arithmetic device 70 and information stored in the storage device 71 via a network such as the Internet or LAN.

In FIG. 1, a case in which the information processing system 1 is realized by one computer is illustrated, but the information processing system 1 may be realized by distributing its functions to a plurality of computers. In the invention, respective processing units are just logically distinguished in functions thereof, and may theoretically or practically form the same area. In addition, the information processing system 1 may function by the wireless client used by a user or may acquire information on the signal strength measured by the wireless client to execute processing on the basis of the information.

The information processing system 1 of the invention includes a signal strength specifying processing unit 10, a distance estimation processing unit 11, a relative-position estimation processing unit 12, an inside/outside determination processing unit 13, and a location area determination processing unit 14.

The signal strength specifying processing unit 10 specifies wireless communication between each access point and the wireless client, for example, a signal strength of radio waves. In a case of communication between the access point and the wireless client, since information indicating the signal strength of radio waves such as RSSI values or dBm values is included in the communication, the signal strength is specified on the basis of the information.

The distance estimation processing unit 11 estimates a distance (straight line distance) between the access point and the wireless client by using a well-known propagation model on the basis of the signal strength specified by the signal strength specifying processing unit 10. The distance estimation processing unit 11 preferably estimates a distance between the wireless client and each of the access points on the basis of the signal strength specified by the signal strength specifying processing unit 10.

The relative-position estimation processing unit 12 estimates a relative position between the wireless client and any n ($3 \leq n \leq N$ (N is the number of installed access points)) access points by using a spring model on the basis of information on the distance between the wireless client and the access point calculated by the distance estimation processing unit 11. Here, the n access points that the wireless client specifies are preferably three access points close to the wireless client, but the invention is not limited thereto, and the n access points may be four or more access points. Whether the access point is close to the wireless client is specified on the basis of the signal strength. If the signal strength is strong, the access point is an access point close to the wireless client, and if the signal strength is weak, the access point is an access point far from the wireless client.

The spring model is a cooperative position estimation method in which springs of which the natural length is the estimated distance are virtually stretched between the access points and between the access point and the wireless client, respectively, and a position at which the sum of the elastic energy of the entirety of springs becomes minimum is regarded as the estimated position. The cooperative position estimation method is not limited to the spring model. In a case where the spring model is used, an estimated position E of the wireless client is calculated by Expression 1.

$$E = \sum_{i=1}^{N-1} \sum_{j=i+1}^{N} \frac{1}{2} k \left( \left\| \hat{l}_i - \hat{l}_j \right\| - d_{ij} \right)^2 \quad \text{(Expression 10}$$

Here, li with the hat is an estimated distance between the access point and the wireless client or between two access points, dij is a natural length (estimated distance) of the virtually stretched spring, and k is a spring constant. In this case, the estimated distance between the access points can be specified by the same processing as that of the distance estimation processing unit 11 on the basis of the signal strength between the access points. The distance between the access point and the wireless client can also be specified by the processing of the distance estimation processing unit 11 on the basis of the signal strength between the access point and the wireless client.

The inside/outside determination processing unit 13 determines whether the wireless client is present inside or outside an area (target area) formed by the access points as vertexes, on the basis of the estimated position of the wireless client calculated by the relative-position estimation processing unit 12. In the inside/outside determination processing for determining whether the wireless client is present inside or outside the target area, the target area is divided into areas (inside/outside determination areas) formed by some access points among the access points forming the target area, and whether the wireless client is present inside or outside each inside/outside determination area is determined using vector product. In a case where the wireless client is determined to be present inside any of the inside/outside determination areas in the target area, the wireless client is determined to be present inside the target area.

Examples of the inside/outside determination processing with respect to the target area are schematically illustrated in FIGS. 4A to 4D. In FIGS. 4A to 4D, a square formed by four access points is set as a target area, and the target area is divided into triangular inside/outside determination areas formed by three access points among the four access points. FIG. 4A illustrates a state where a triangle ABC is set as an inside/outside determination area, FIG. 4B illustrates a state where a triangle BCD is set as an inside/outside determination area, FIG. 4C illustrates a state where a triangle ACD is set as an inside/outside determination area, and FIG. 4D illustrates a state where a triangle ABD is set as an inside/outside determination area. In a case where the wireless client is determined to be present inside any of the triangular inside/outside determination areas in the square ABCD as the target area, the wireless client is determined to be present inside the target area.

Both the target area and the inside/outside determination area may have a polygonal shape. Note that when the target area is an m-gon and the inside/outside determination area is an n-gon, a relationship of m≥n is satisfied. The inside/outside determination area is preferably a triangle, but may be a polygon equal to or more than a square.

Figures 5A, 5B:
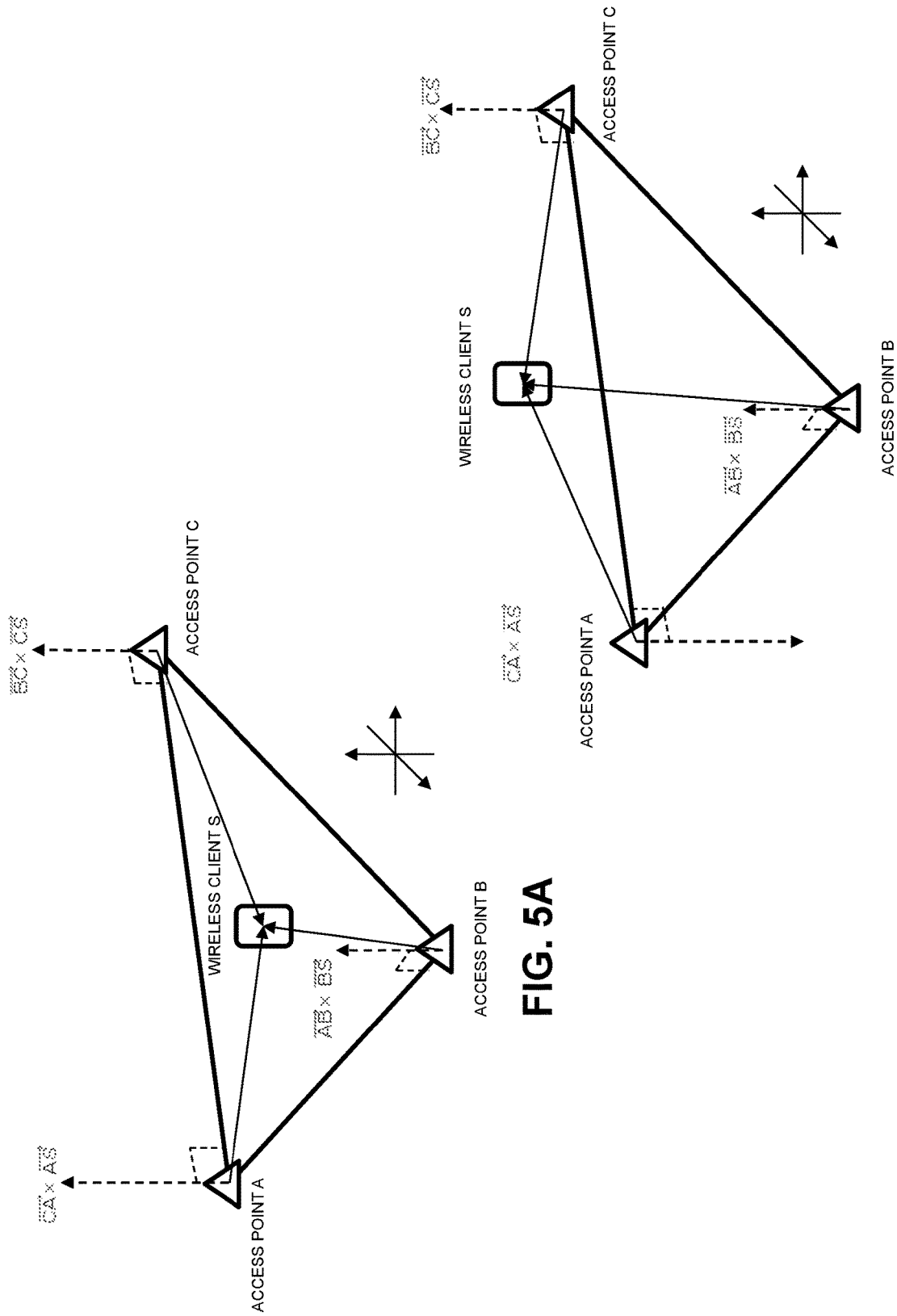
FIGS. 5A and 5B are diagrams schematically illustrating an example of processing of determining whether a wireless client is present inside or outside an area formed by access points.

Whether the wireless client is present inside or outside a certain area is determined on the basis of whether the directions (z axes) of the vector products each of which is calculated from two vectors defined with respect to each of access points forming the area are the same or different from each other. The two vectors correspond to a position vector of the wireless client seen from the corresponding access point and a position vector of the corresponding access point seen from another access point. In a case where the directions of the vector products are the same, the wireless client is determined to be present inside the area, and in a case where the directions of the vector products are different from each other, the wireless client is determined to be present outside the area. Examples of processing of determining whether a wireless client is present inside or outside an area are schematically illustrated in FIGS. 5A and 5B. By this processing, it is possible to determine whether the wireless client is present inside or outside the inside/outside determination area.

The above-described processing is executed by the inside/outside determination processing unit 13 and thus it is possible to determine whether the wireless client is present inside or outside the target area.

Without the target area being divided into a plurality of inside/outside determination areas, whether the wireless client is present inside or outside the target area may be determined by performing determination using the direction of the vector product with respect to the target area with the target area being regarded as the inside/outside determination area.

The location area determination processing unit 14 determines which area the wireless client is located in, in a space in which a plurality of target areas are set.

Figure 6:
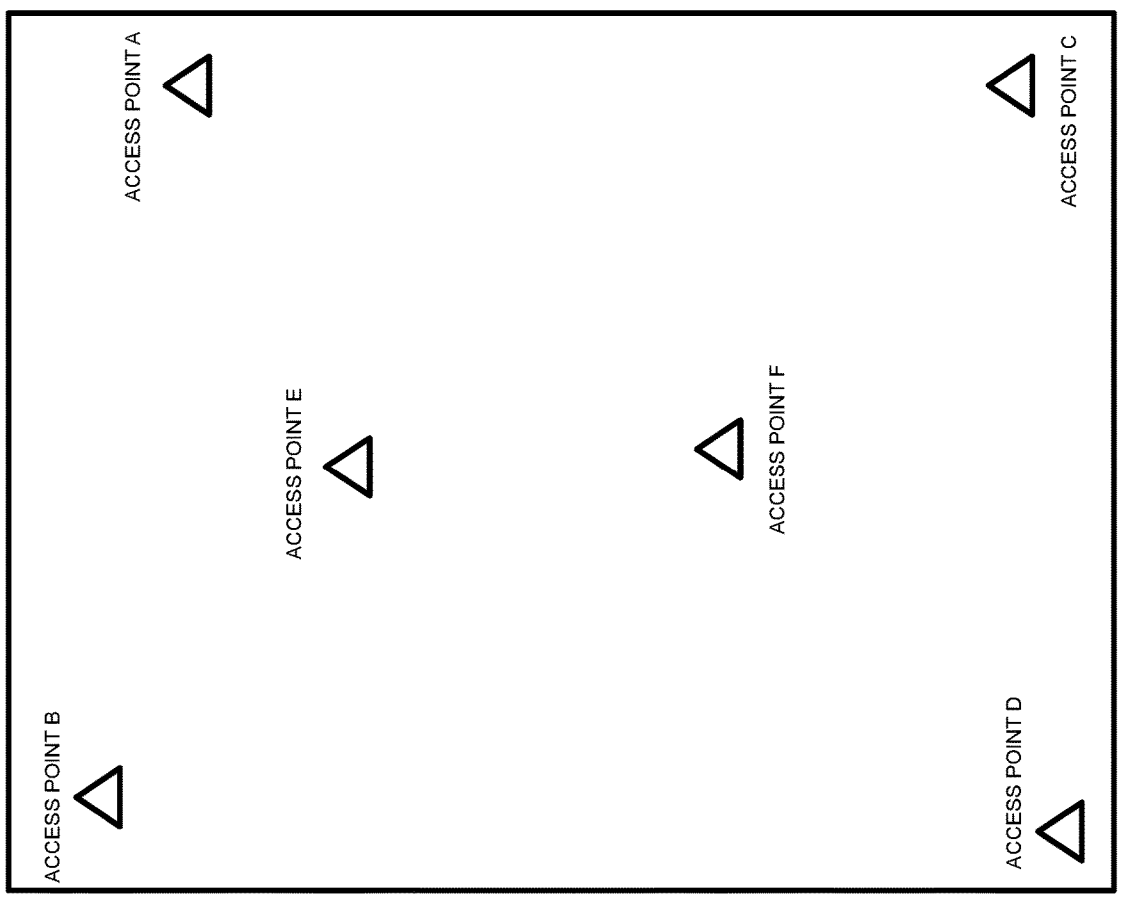
FIG. 6 is a diagram schematically illustrating an example of a state in which six access points are installed in a certain space.
Figure 8:
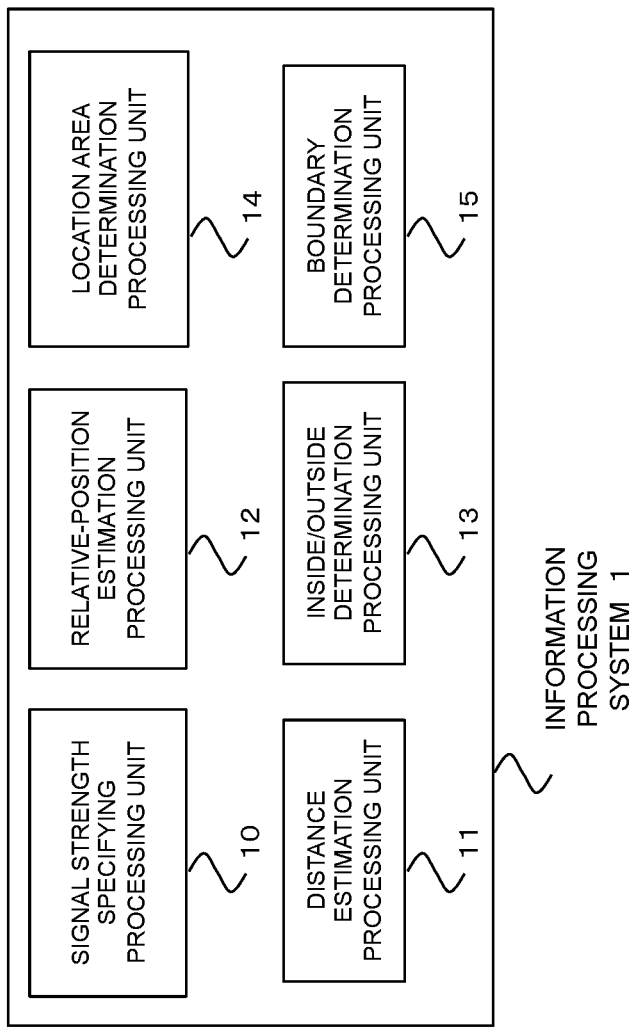
FIG. 8 is a block diagram schematically illustrating an example of processing functions of an information processing system according to Example 2.

For example, as illustrated in FIG. 6, it is assumed that six access points, which are access points A to F, are installed in a certain space. In a case where the target area is formed by four access points among the six access points, 15 target areas illustrated in FIGS. 7A to 7O can be set. The inside/outside determination processing unit 13 executes the inside/outside determination processing for each target area, and the location area determination processing unit 14 determines that the wireless client is present inside an area (range) which is common in the target areas for which determination is made that the wireless client is present inside. This determination result may appropriately be displayed on the display device 72 or the like.

The above-described processing is executed by the location area determination processing unit 14, and thus it is possible to determine which area (range) the wireless client is located in, in a space which is divided into a plurality of target areas. Since the wireless client is determined using an area without specifying the position coordinates thereof as in the three-point positioning in the related art, it is not necessary to strictly set the position coordinates of the access point and the position of the access point can be simply changed.

Example 1

Figure 3:
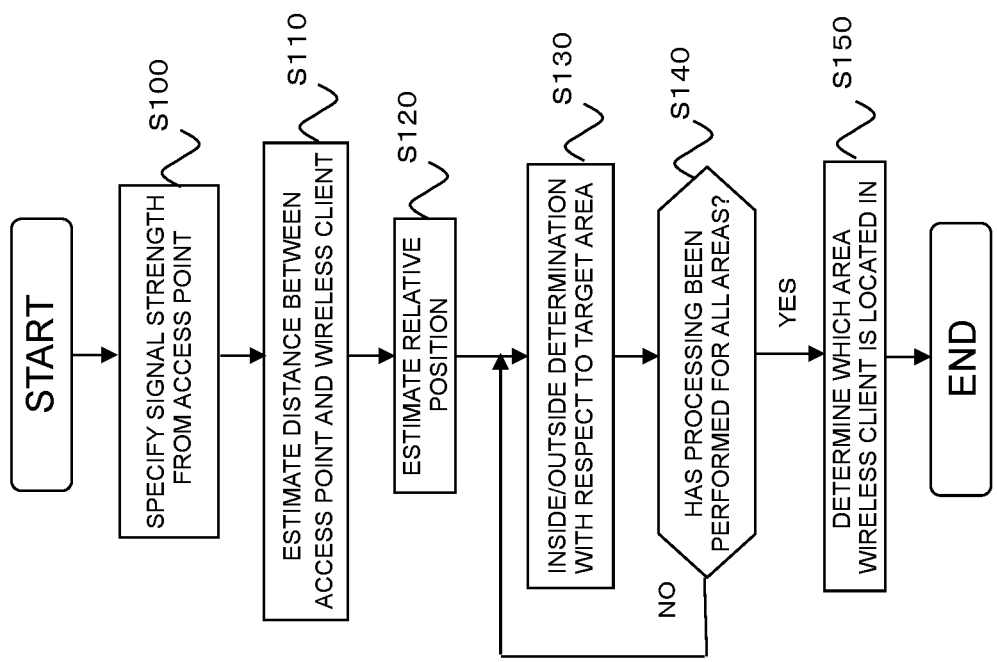
FIG. 3 is an example of a flowchart illustrating an example of a processing process of the information processing system of the invention.

An example of a processing process of the information processing system 1 of the invention will be described using a flowchart of FIG. 3.

First, any number of (N) access points are installed in a space. Then, a target area formed by the installed access points is set. The target area is set such that the rough positions of the installed access points are designated in a plane diagram expressing the space, by using the input device 73 such as a mouse. Then, the number of access points forming the target area (the number of vertexes of a polygon forming the target area) is set, and the target area can be automatically set. For example, among the installed access points, access points corresponding to the number of access points forming the target area are specified, and the combinations of polygons formed by the specified access points may be set as the target areas.

Here, all the set target areas may be set as processing targets or some of the set target areas may be set as processing targets. If the number of the target areas as the processing target is set to be large, it is possible to increase the accuracy of the area (location area) where the wireless client is located. The distance between access points can be specified by using a propagation model on the basis of the signal strength between the access points.

In a case where the wireless client is present in the space, the signal strength specifying processing unit 10 specifies the signal strength between the wireless client and the access point installed in the space through the communication (S100). The distance estimation processing unit 11 calculates an estimated distance between the wireless client and each access point by using a propagation model (S110).

After the distance estimation processing unit 11 calculates the estimated distance between the wireless client and each access point, the relative-position estimation processing unit 12 specifies any n ($3 \leq n \leq N$), for example, three access points which are present close to the wireless client, on the basis of the signal strength. Then, the relative position of the wireless client is estimated by using a spring model on the basis of information on the distance (estimated distance) between the wireless client and the specified access point (S120).

If the relative-position estimation processing unit 12 estimates the relative position of the wireless client, the inside/outside determination processing unit 13 executes inside/outside determination processing of determining whether the wireless client is present inside or outside a target area set in advance (S130). That is, in a case where target areas are set as illustrated in FIGS. 7A to 7O, the inside/outside determination processing is executed for each target area. In this case, the inside/outside determination processing unit 13 divides the target area into a plurality of inside/outside determination areas, and determines whether the wireless client is present inside or outside the divided inside/outside determination area, for each of the divided inside/outside determination areas, by using the vector product. In a case where determination is made that the wireless client is present inside the divided inside/outside determination area for any of the divided inside/outside determination areas, the wireless client is determined to be present inside the target area.

By further dividing the target area into the inside/outside determination areas as described above, even in a case where there is shadowing or the signal strength is changed, it is possible to increase the accuracy of determining whether the wireless client is present inside or outside the target area.

When the inside/outside determination processing unit 13 executes the inside/outside determination processing for all the set target areas (S140), the location area determination processing unit 14 specifies an area (range) which is common in the target areas for which determination is made that the wireless client is present inside. Then, the wireless client is determined to be located in the determined area (range) (S150).

By executing the above-described processing, it is possible to determine an area (range) where the wireless client is located, in the space.

Example 2

Next, a case where boundary determination processing is provided in the information processing system 1 of the invention will be described. An example of processing functions of the information processing system 1 in the present example is schematically illustrated in a block diagram.

The information processing system 1 in the present example includes a boundary determination processing unit 15 in addition to the configuration in Example 1.

The boundary determination processing unit 15 determines whether the wireless client is present near a boundary of the target area. That is, the boundary determination processing unit 15 executes boundary determination processing of determining whether the wireless client is present inside or outside a boundary area of the target area on the basis of the magnitude of vector product calculated from the distance between the access points forming a side of the target area and the relative position between the wireless client and the access point. The area near the boundary is referred to as a boundary area.

Figure 10:
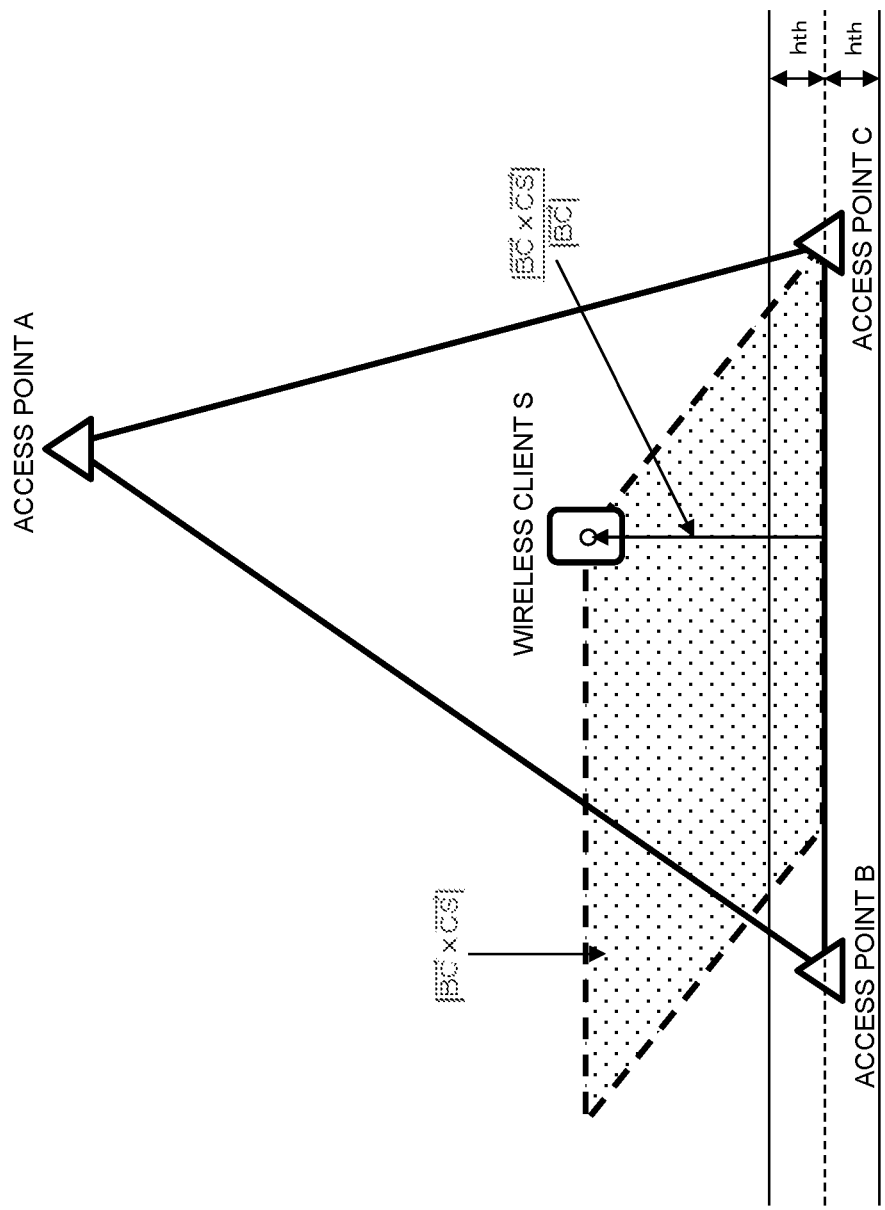
FIG. 10 is a diagram schematically illustrating an example of boundary determination processing.
Figure 11:
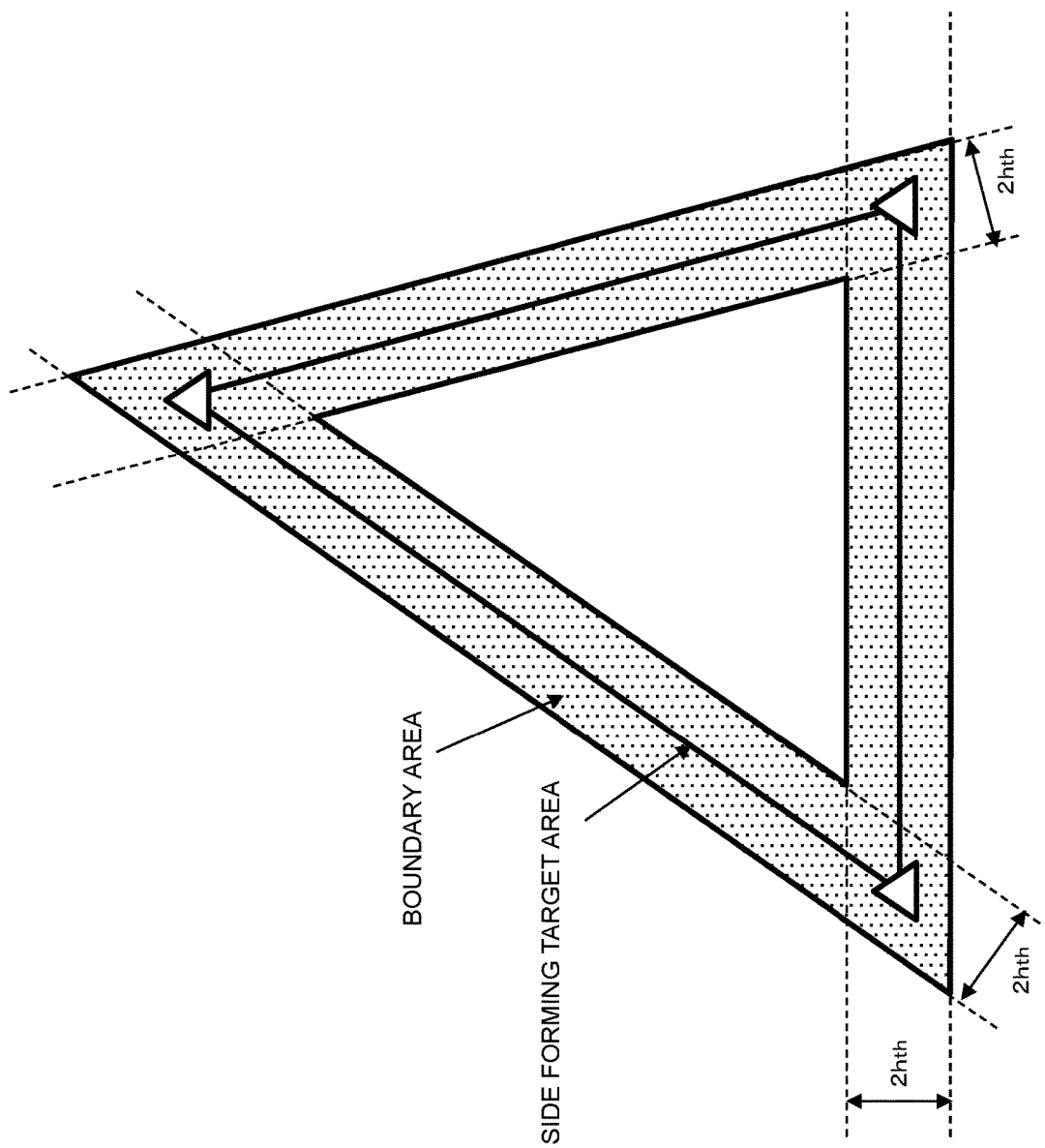
FIG. 11 is a diagram schematically illustrating a boundary area of a triangular target area.

Specifically, the boundary determination processing unit 15 calculates, for each of sides forming the target area, a distance between the wireless client and a straight line including a side on the basis of the magnitude of vector product calculated from the distance between the access points and the relative position between the wireless client and the access point. Among the distances, in a case where two distances are shorter than a predetermined reference distance hth or in a case where one distance is shorter than the reference distance hth and the longer one of the distances between the wireless client and two access points forming the corresponding side is shorter than the length of the side, the wireless client is determined to be present inside the boundary area. Meanwhile, in a case other than the above-described cases, the wireless client is determined to be present outside the boundary area. The boundary determination processing is schematically illustrated in FIG. 10. A boundary area of the triangular target area is illustrated in FIG. 11. The shaded portion in FIG. 11 is the boundary area.

By executing such processing, in a case where the distance from one side of the target area which is the determination target to the wireless client is shorter than the reference distance hth which is predetermined as the boundary area, the wireless client can be determined to be present inside the boundary area, and in a case where the distance is longer than the reference distance hth, the wireless client can be determined to be present outside the boundary area. The distance from one side of the target area to the wireless client can be calculated from the magnitude of vector product. As illustrated in FIG. 10, since the magnitude of vector product is equal to the size of a parallelogram formed by two vectors of the vector product, the distance from one side to the wireless client can be calculated by obtaining the height of the parallelogram using Expression 2.

$$\text{DISTANCE TO WIRELESS CLIENT} = \frac{|\vec{BC} \times \vec{CS}|}{|\vec{BC}|} \quad \text{(Expression 2)}$$

Therefore, in a case where a relationship of Expression 3 is satisfied, the wireless client can be determined to be present inside the boundary area.

$$h_{th} < \frac{|\vec{BC} \times \vec{CS}|}{|\vec{BC}|} \quad \text{(Expression 3)}$$

In a case where the boundary determination processing unit 15 determines that the wireless client is present inside the boundary area, the wireless client is determined to be present inside the target area and thus the inside/outside determination processing is not executed. In a case where the boundary determination processing unit 15 determines that the wireless client is present outside the boundary area, the inside/outside determination processing is executed in the same manner as Example 1.

Figure 9:
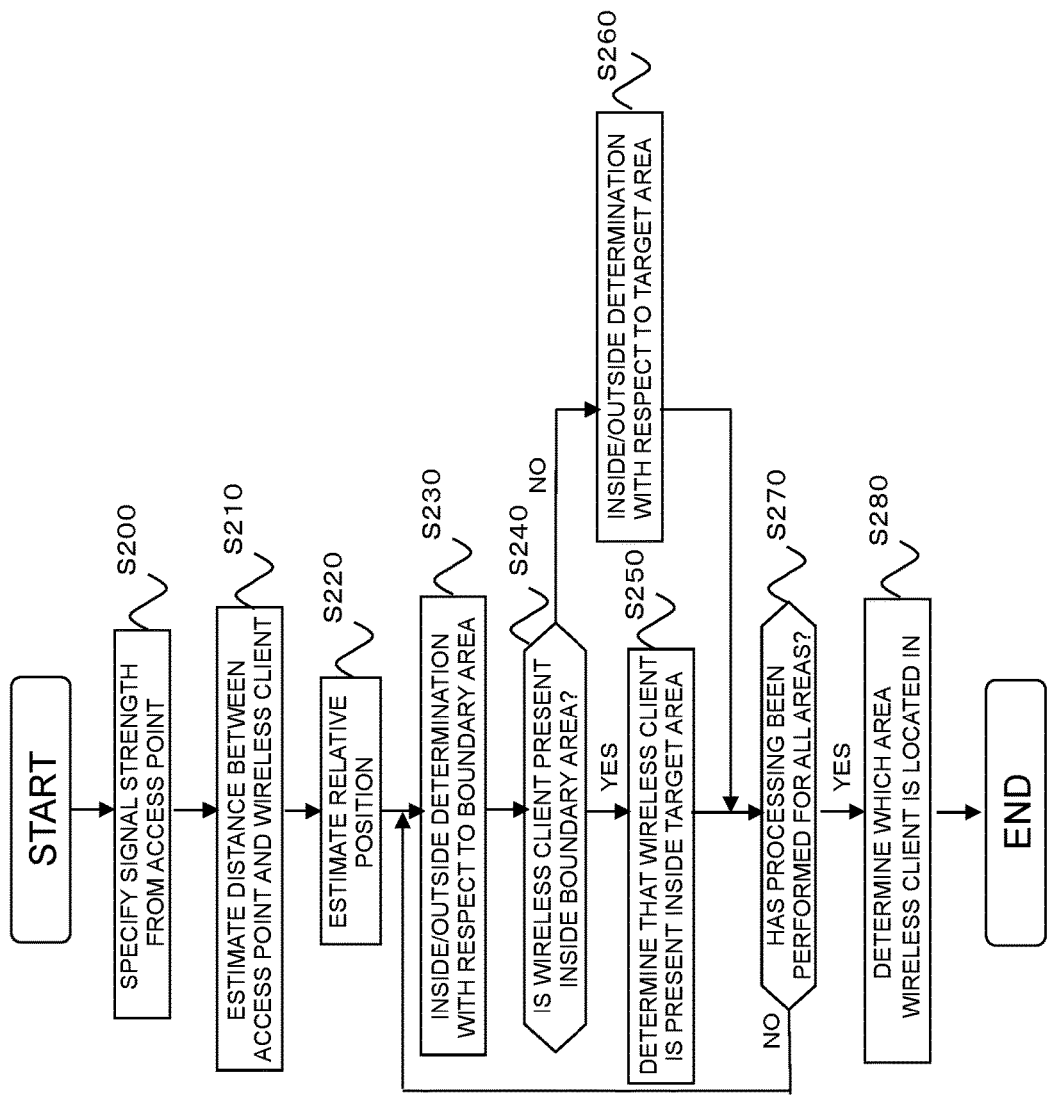
FIG. 9 is an example of a flowchart illustrating an example of a processing process of the information processing system according to Example 2.

Next, an example of a processing process of the information processing system 1 of Example 2 will be described using a flowchart of FIG. 9.

In the same manner as Example 1, first, any number of (N) access points are installed in a space. Then, a target area formed by the installed access points is set. The distance between access points can be specified by using a propagation model on the basis of the signal strength between the access points.

In a case where the wireless client is in the space, the signal strength specifying processing unit 10 specifies the signal strength between the wireless client and each of all the access points installed in the space through the communication (S200). The distance estimation processing unit 11 calculates an estimated distance between the wireless client and each access point by using a propagation model (S210).

After the distance estimation processing unit 11 calculates the estimated distance between the wireless client and each of all the access points, the relative-position estimation processing unit 12 estimates the relative position of the wireless client by using a spring model on the basis of information on the distance (estimated distance) between the wireless client and each of all the access points (S220). The case where the relative position of the wireless client is estimated on the basis of information on the distance between the wireless client and each of all the access points has been described. However, as in Example 1, any n ($3 \leq n \leq N$), for example, three access points which are present close to the wireless client may be specified on the basis of the signal strength, and the relative position of the wireless client may be estimated by using a spring model on the basis of information on the distance (estimated distance) between the wireless client and the specified access point.

If the relative-position estimation processing unit 12 estimates the relative position of the wireless client, the boundary determination processing unit 15 executes boundary determination processing of determining whether the wireless client is present inside or outside a boundary area of the target area set in advance (S230).

As a result of the boundary determination processing by the boundary determination processing unit 15, in a case where the wireless client is determined to be present inside the boundary area of the target area (YES in S240), the wireless client is determined to be present inside the target area (S250), and the boundary determination processing unit 15 executes the boundary determination processing for other non-processed target areas (S270).

Meanwhile, as a result of the boundary determination processing by the boundary determination processing unit 15, in a case where the wireless client is determined to be present outside the boundary area of the target area (NO in S240), the inside/outside determination processing unit 13 executes the inside/outside determination processing for the target area in the same manner as Example 1 (S260).

That is, in the inside/outside determination processing, in the same manner as Example 1, the inside/outside determination processing unit 13 divides the target area into inside/outside determination areas, and determines whether the wireless client is present inside or outside the divided inside/outside determination area, for each of the divided inside/outside determination areas, by using the direction of the vector product. In a case where determination is made that the wireless client is present inside the divided inside/outside determination area for any of the divided inside/outside determination areas, the wireless client is determined to be present inside the target area.

When the wireless client is determined to be present inside or outside the target area, the boundary determination processing unit 15 executes the boundary determination processing for other non-processed target areas (S270).

In this manner, when determination on whether the wireless client is present inside or outside the target area is performed for all the target areas set as the processing target, the location area determination processing unit 14 specifies an area (range) which is common in the target areas for which determination is made that the wireless client is present inside, in the same manner as Example 1. Then, the wireless client is determined to be located in the determined area (range) (S280).

By executing the above-described processing, it is possible to determine an area (range) where the wireless client is located, in the space.

Example 3

Figure 12:
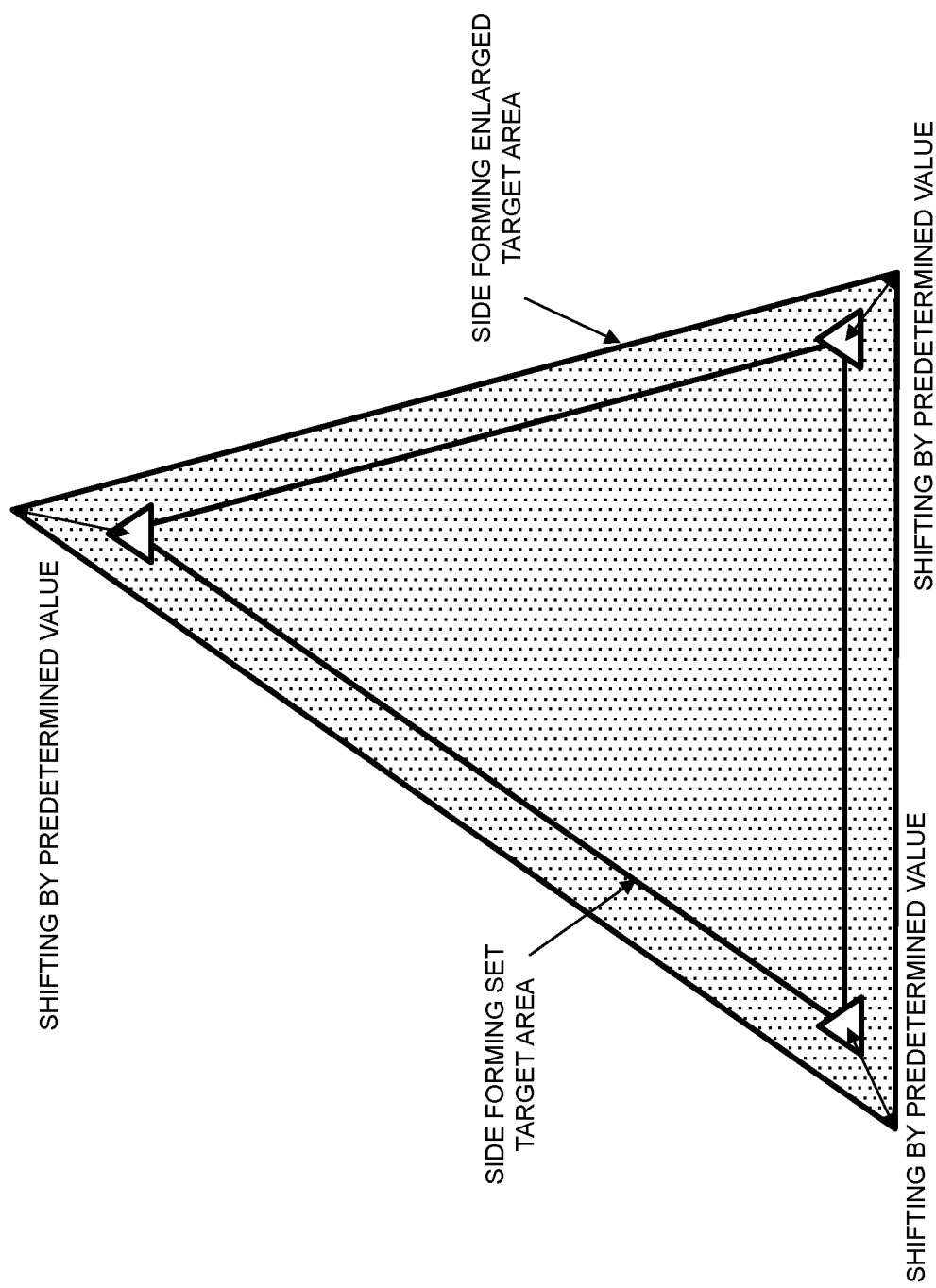
FIG. 12 is a diagram schematically illustrating a target area which is set to be enlarged from a target area in Example 3.

The case in which the boundary area used in the boundary determination processing unit 15 is set has been described in Example 2. However, without using the boundary area, the target area itself is enlarged by a predetermined ratio or a predetermined value in a predetermined direction, and the processing same as that in Example 1 may be executed. The enlarged area is schematically illustrated in FIG. 12. That is, the distance between access points forming the target area set in advance is increased by a predetermined ratio (or predetermined value) in a predetermined direction, and the distance between the access point and the wireless client is increased by a predetermined ratio (or predetermined value) in a predetermined direction. The inside/outside determination processing unit 13 executes the inside/outside determination processing for the enlarged target area. Here, the predetermined ratio or the predetermined value used for the enlargement is preferably a ratio or a value corresponding to the predetermined reference distance hth used as the boundary area in Example 2, but may be set arbitrarily.

In addition, the processing same as that in Example 1 may be executed by enlarging the area of the target area by a predetermined ratio or a predetermined value while the similarity is maintained.

Example 4

By using the information processing system 1 of the invention, it is possible to determine whether the wireless client is present inside or outside an area formed by the access points. Therefore, for example, in a case where the access points are installed in a building, if the wireless client is determined to be present outside all of the areas formed by the access points, the wireless client may be considered to be present outside the building.

In a case where the inside/outside determination processing unit 13 of the information processing system 1 determines that the wireless client is present outside all of the areas formed by the access points installed in the building, a control instruction to shut down the communication with the wireless client may be transmitted to the access points.

Alternatively, contrary to the above description, in a case where the inside/outside determination processing unit 13 determines that the wireless client is present inside any of the areas formed by the access points, a control instruction to allow the communication with the wireless client may be transmitted to the access points.

In this manner, it is possible to shut down the communication of the wireless client from the outside of the building, and it is possible to improve the security.

The case in which the access points are installed in the building has been described, but the access points may be installed in a range where the communication by the wireless client is allowable without being limited to the building. For example, the access points are installed in a partial space of an exhibition hall, and it is possible to allow the communication only with the wireless client which is present inside the space and to shut down the communication with the wireless client which is present outside the space.

In the specification, the processing can be appropriately modified in a range not departing from the technical idea of the invention. For example, the order of processing may be changed, part of processing may not be executed, and processing may be added.

By using the information processing system 1 of the invention, it is possible to estimate the position of the wireless client while reducing a burden on work of installing the access point. In addition, it is possible to estimate the position of the wireless client while reducing the influence of shadowing.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. An information processing system, comprising:
   circuitry configured to:
   estimate a relative position between each access point of a plurality of access points and a wireless client based on a cooperative position estimation method, wherein
   the cooperative position estimation method is based on distance information, and
   the distance information is based on a signal strength between the each access point of the plurality of access points and the wireless client;
   determine an inside/outside positional relationship between a wireless client and a polygonal target area formed by the plurality of access points; and
   determine whether the wireless client is present inside the polygonal target area or outside the polygonal target area based on a comparison of directions of vector products, wherein the directions of the vector product are calculated based on crossing a position vector from one access point to the wireless client with a position vector from another access point other than the one access point to the one access point, for each access point of the plurality of access points forming the polygonal target area;
   wherein the position vectors are determined from the relative position estimation.

2. The information processing system according to claim 1, wherein the circuitry is further configured to:
   divide the polygonal target area into a plurality of inside/outside determination areas,
   determine, whether the wireless client is present inside the plurality of inside/outside determination areas or outside the plurality of inside/outside determination areas, based on a comparison of directions of vector products, wherein the directions of the vector product are calculated based on crossing a position vector from one access point to the wireless client with a position vector from another access point other than the one access point to the one access point, for each access point of the plurality of access points forming the polygonal target area; and
   determine that the wireless client is present inside the polygonal target area based on the determination that the wireless client is present inside at least one of the plurality of inside/outside determination areas.

3. The information processing system according to claim 2, wherein the polygonal target area is an area formed by increasing a distance between the plurality of access points or a distance between the access point and the wireless client by a predetermined ratio or a predetermined value.

4. The information processing system according to claim 2, wherein the polygonal target area is an area formed by enlarging an area of the polygonal target area by a predetermined ratio or a predetermined value while a similarity is maintained.

5. The information processing system according to claim 2, wherein each inside/outside determination area of the plurality of inside/outside determination areas corresponds to a triangular inside/outside determination area.

6. The information processing system according to claim 1, wherein the circuitry is further configured to determine that the wireless client is inside the polygonal target area based on determination that a comparison of directions of the vector products associated with the one access point is same as a comparison of directions of the vector products associated with the other access point.

7. The information processing system according to claim 1, wherein the circuitry is further configured to determine that the wireless client is outside the polygonal target area based on determination that a comparison of directions of the vector products associated with the one access point is different from a comparison of directions of the vector products associated with the other access point.

8. A non-transitory computer-readable medium having stored thereon computer-readable instructions, which when executed by a computer, cause the computer to execute operations, the operations comprising:
   estimating a relative position between each access point of a plurality of access points and a wireless client based on a cooperative position estimation method, wherein
   the cooperative position estimation method is based on distance information, and
   the distance information is based on a signal strength between the each access point of the plurality of access points and the wireless client;
   determining an inside/outside positional relationship between a wireless client and a polygonal target area formed by the plurality of access points; and
   determining whether the wireless client is present inside the polygonal target area or outside the polygonal target area based on a comparison of directions of vector products, wherein the directions of the vector products are calculated based on crossing a position vector from one access point to the wireless client with a position vector from another access point other than the one access point to the one access point, for each access point of the plurality of access points forming the polygonal target area;

wherein the position vectors are determined from the relative position estimation.

\* \* \* \* \*